United States Patent
Basu et al.

(10) Patent No.: US 11,736,464 B2
(45) Date of Patent: Aug. 22, 2023

(54) BACKUP AUTHENTICATION SYSTEM CONFIGURED TO USE AN AUTHENTICATION PACKAGE FROM A PRIMARY AUTHENTICATION SYSTEM TO AUTHENTICATE A PRINCIPAL

(71) Applicant: Microsoft Technology Licensing, LLC, Redmond, WA (US)

(72) Inventors: Anirban Basu, Sammamish, WA (US); Oren Jordan Melzer, Redmond, WA (US); Kamen K. Moutafov, Sammamish, WA (US); Victor Boctor, Bellevue, WA (US); Shuang Lu, Bellevue, WA (US); Sarvani Kumar Bhamidipati, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 17/334,648

(22) Filed: May 28, 2021

(65) Prior Publication Data

US 2022/0385646 A1    Dec. 1, 2022

(51) Int. Cl.
*H04L 9/40*    (2022.01)
*H04L 9/32*    (2006.01)
*H04L 67/56*    (2022.01)

(52) U.S. Cl.
CPC ............ *H04L 63/08* (2013.01); *H04L 9/3247* (2013.01); *H04L 67/56* (2022.05)

(58) Field of Classification Search
CPC ....... H04L 63/08; H04L 9/3247; H04L 67/56; H04L 9/321; H04L 63/0884; H04L 63/20
See application file for complete search history.

(56) References Cited

U.S. PATENT DOCUMENTS 9,967,395 B1 *   5/2018   Karimli ............... H04M 15/765
10,356,128 B1 *   7/2019   Lango ................. H04L 63/0263
(Continued)

OTHER PUBLICATIONS

"What is a Reverse Proxy? | Proxy Servers Explained", Retrieved From: https://web.archive.org/web/20210510122751/https://www.cloudflare.com/learning/cdn/glossary/reverse-proxy/, May 10, 2021, 6 Pages.

(Continued)

*Primary Examiner* — Aravind K Moorthy
(74) *Attorney, Agent, or Firm* — Wade IP Law PLLC

(57) ABSTRACT

Techniques are described herein that are capable of using an authentication package from a primary authentication system to authenticate a principal by a backup authentication system. The authentication package includes an authentication artifact, which is signed with a cryptographic key by the primary authentication system and which includes claim(s) that are usable to authenticate the principal, and further includes metadata. The metadata includes credential verification information that is usable to verify a credential of the principal and a first principal identifier that identifies the principal. A request to authenticate the principal is received at the backup authentication system. The request includes the credential and a second principal identifier that identifies the principal. The principal is authenticated by the backup authentication system by verifying the credential using the credential verification information and further by determining that the first principal identifier corresponds to the second principal identifier.

20 Claims, 5 Drawing Sheets

(56) References Cited

U.S. PATENT DOCUMENTS

| | | | |
|---|---|---|---|
| 10,362,007 B2* | 7/2019 | Hill | H04L 63/06 |
| 10,509,914 B1* | 12/2019 | Desai | G06F 21/604 |
| 10,652,281 B1* | 5/2020 | Moolenaar | H04L 63/0236 |
| 10,832,244 B1* | 11/2020 | Chowdhury | G06Q 20/388 |
| 10,972,465 B1* | 4/2021 | Bendersky | H04L 63/10 |
| 11,140,061 B1* | 10/2021 | Sanders | G06F 21/577 |
| 11,240,275 B1* | 2/2022 | Vashisht | H04L 63/145 |
| 11,256,573 B1* | 2/2022 | Ambaljeri | G06F 11/1461 |
| 11,363,012 B1* | 6/2022 | Chhabra | H04L 9/0894 |
| 11,574,035 B2* | 2/2023 | Singh | H04L 9/3213 |
| 11,626,996 B2* | 4/2023 | Campagna | H04L 9/0822 713/168 |
| 11,626,998 B2* | 4/2023 | Mozano | H04L 9/3213 713/178 |
| 2003/0208681 A1* | 11/2003 | Muntz | G06F 21/6209 713/179 |
| 2012/0174198 A1* | 7/2012 | Gould | H04L 63/0807 726/6 |
| 2013/0246796 A1* | 9/2013 | Lichtenstadt | G06F 21/6227 713/176 |
| 2014/0181922 A1* | 6/2014 | Jakobsson | H04L 63/083 726/5 |
| 2015/0288694 A1* | 10/2015 | Liebl, III | H04L 9/3247 713/182 |
| 2016/0050272 A1* | 2/2016 | Raduchel | H04L 63/10 709/204 |
| 2016/0191544 A1* | 6/2016 | Kim | H04L 63/105 713/171 |
| 2017/0006020 A1* | 1/2017 | Falodiya | G06F 8/61 |
| 2017/0201550 A1* | 7/2017 | Benson | H04L 63/0815 |
| 2017/0279720 A1* | 9/2017 | Patnaik | H04L 63/0428 |
| 2018/0041488 A1* | 2/2018 | Kohli | H04L 63/20 |
| 2018/0152455 A1* | 5/2018 | Lee | H04L 63/0884 |
| 2018/0234464 A1* | 8/2018 | Sim | H04L 9/3213 |
| 2018/0278607 A1* | 9/2018 | Loladia | H04L 61/4588 |
| 2018/0337920 A1* | 11/2018 | Stites | G06F 21/73 |
| 2018/0349581 A1* | 12/2018 | Ramalingam | H04L 9/0891 |
| 2019/0058700 A1* | 2/2019 | Kurian | H04W 12/065 |
| 2019/0069010 A1* | 2/2019 | Wang | G06F 21/10 |
| 2019/0207937 A1* | 7/2019 | Neilan | H04L 9/0877 |
| 2019/0378142 A1* | 12/2019 | Darnell | H04L 9/3297 |
| 2020/0065427 A1* | 2/2020 | Tofighbakhsh | G06F 16/907 |
| 2020/0177385 A1* | 6/2020 | Kumar | G06F 21/57 |
| 2020/0177589 A1* | 6/2020 | Mangalvedkar | G06F 16/245 |
| 2021/0021428 A1* | 1/2021 | Landman | G06F 8/60 |
| 2021/0135869 A1 | 5/2021 | Barhudarian et al. | |
| 2021/0136076 A1 | 5/2021 | Barhudarian et al. | |
| 2021/0136114 A1 | 5/2021 | Barhudarian et al. | |
| 2021/0141923 A1* | 5/2021 | Wu | G06F 21/6236 |
| 2021/0209079 A1* | 7/2021 | Lynch | H04L 9/0618 |
| 2021/0226951 A1* | 7/2021 | Goldstein | H04L 63/126 |
| 2021/0234850 A1* | 7/2021 | Vogt | H04W 12/06 |
| 2021/0243038 A1* | 8/2021 | Wilson | H04L 9/3247 |
| 2021/0367938 A1* | 11/2021 | Praszczalek | H04L 63/0861 |
| 2021/0374684 A1* | 12/2021 | Qiao | G06Q 10/1095 |
| 2021/0377044 A1* | 12/2021 | Leibmann | H04L 9/3247 |
| 2022/0029820 A1* | 1/2022 | Mozano | H04L 9/0891 |
| 2022/0067712 A1* | 3/2022 | Sarin | G06Q 20/3678 |
| 2022/0123950 A1* | 4/2022 | Erickson | G06F 9/5072 |
| 2022/0141220 A1* | 5/2022 | Lind | H04L 63/0838 726/1 |
| 2022/0229933 A1* | 7/2022 | Lieb | G06F 21/6245 |
| 2022/0261487 A1* | 8/2022 | Lounsberry | G06F 21/62 |
| 2022/0276848 A1* | 9/2022 | Garaev | H04L 9/0894 |
| 2022/0309161 A1* | 9/2022 | Bhide | G06F 21/54 |
| 2022/0366038 A1* | 11/2022 | Summers | G06F 21/552 |
| 2022/0385649 A1* | 12/2022 | Basu | H04L 63/083 |
| 2022/0385660 A1 | 12/2022 | Basu et al. | |

OTHER PUBLICATIONS

Singhal, et al., "Microsoft Identity Platform and OpenID Connect Protocol", Retrieved From: https://docs.microsoft.com/en-us/azure/active-directory/develop/v2-protocols-oidc#sample-request, May 22, 2020, 9 Pages.

* cited by examiner

BACKUP AUTHENTICATION SYSTEM CONFIGURED TO USE AN AUTHENTICATION PACKAGE FROM A PRIMARY AUTHENTICATION SYSTEM TO AUTHENTICATE A PRINCIPAL

BACKGROUND

Authentication of a principal (e.g., user or application) establishes truth of an assertion that an entity is the principal. For instance, such authentication of a principal often is a prerequisite for the principal to gain access to a resource (e.g., server resource) for a designated period of time. Authentication systems typically generate authentication artifacts (e.g., access tokens, identification (ID) tokens, and refresh tokens) that may be used to authenticate principals, and the authentication artifacts may designate the periods of time for which access to the resources is to be granted. During outages of the authentication systems, principals traditionally are not able to authenticate and maintain access to resources after expiration of their previously received authentication artifacts. For example, an authentication artifact typically is issued in real time when requested by a principal. If an authentication system that possesses a key that is used to issue authentication artifacts encounters an outage for even a moment, any principal that requests an authentication artifact in that moment traditionally will not receive the requested authentication artifact and will therefore be unable to access the resource for which authentication was sought.

SUMMARY

Various approaches are described herein for, among other things, using an authentication package from a primary authentication system to authenticate a principal by a backup authentication system. For example, the backup authentication system may perform authentication duties when the primary authentication system is unable to provide valid responses to authentication requests. In accordance with this example, the backup authentication system may receive the authentication package from the primary authentication system while the primary authentication system is capable of providing valid responses to authentication requests so that the authentication package may be used by the backup authentication system when the primary authentication system becomes unable to provide such valid responses. The authentication package includes an authentication artifact and metadata. The authentication artifact is signed with a cryptographic key by the primary authentication system. The authentication artifact includes claim(s) that can be used to authenticate the principal.

In an example approach of using an authentication package from a primary authentication system to authenticate a principal by a backup authentication system, the authentication package is stored by the backup authentication system. The metadata includes credential verification information that is usable to verify a credential of the principal. The metadata further includes a first principal identifier that identifies the principal. A request to authenticate the principal is received at the backup authentication system. The request includes the credential of the principal and a second principal identifier that identifies the principal. The principal is authenticated by the backup authentication system by verifying the credential of the principal, which is included in the request to authenticate the principal, using the credential verification information and further by determining that the first principal identifier, which is included in the metadata, corresponds to the second principal identifier, which is included in the request to authenticate the principal, based at least in part on the request requesting authentication of the principal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
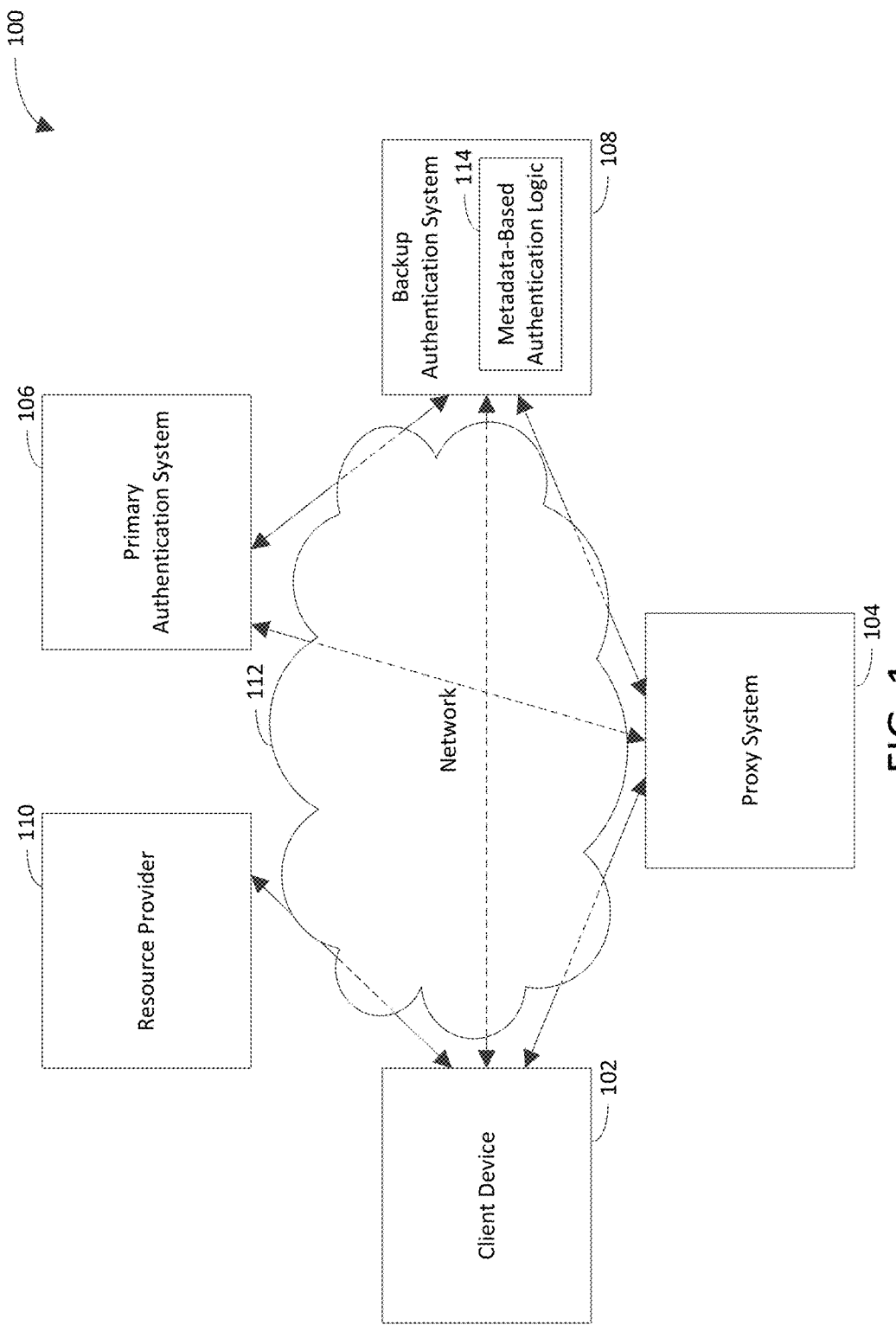
FIG. 1 is a block diagram of an example metadata-based authentication system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of using an authentication package from a primary authentication system to authenticate a principal by a backup authentication system. For example, the backup authentication system may perform authentication duties when the primary authentication system is unable to provide valid responses to authentication requests. In accordance with this example, the backup authentication system may receive the authentication package from the primary authentication system while the primary authentication system is capable of providing valid responses to authentication requests so that the authentication package may be used by the backup authentication system when the primary authentication system becomes unable to provide such valid responses. The authentication package includes an authentication artifact and metadata. The authentication artifact is signed with a cryptographic key by the primary authentication system. The authentication artifact includes claim(s) that can be used to authenticate the principal.

Example techniques described herein have a variety of benefits as compared to conventional techniques for authenticating a principal. For instance, the example techniques may enable a principal to be authenticated even if a primary authentication system is not capable of providing a valid response to an authentication request. By utilizing a backup authentication system that stores an authentication artifact signed by the primary authentication system, availability and reliability of an authentication system that includes the primary authentication system and the backup authentication system may be increased. For instance, the example techniques may reduce a likelihood that the authentication system is to experience an outage. The backup authentication system may be isolated from the primary authentication system. For example, the primary authentication system and the backup authentication system may be hosted on different (e.g., separate) clouds and/or in different regions of the world.

The example techniques may reduce an amount of time and/or resources (e.g., processor cycles, memory, network bandwidth) that is consumed to obtain authentication of principals in a networked environment and/or to perform operations that rely on such authentication. For instance, by avoiding multiple attempts to authenticate a principal due to an outage of the authentication system, a computing system may conserve the time and resources that would have been consumed by the computing system to execute the additional attempts. The example techniques may thereby reduce a cost associated with obtaining authentication of the principals and/or performing the operations that rely on the authentication.

The example techniques may increase speed and/or efficiency of a computing system by eliminating delays caused by a failure of an authentication system to provide a valid response to an authentication request provided by the computing system. The example techniques may improve (e.g., increase) a user experience and/or increase efficiency of a principal that seeks authentication for purposes of accessing a resource, for example, by more reliably providing such authentication. For instance, by more reliably authenticating the principal, an amount of the principal's time that would have been consumed to seek and obtain authentication may be reduced.

FIG. 1 is a block diagram of an example metadata-based authentication system 100 in accordance with an embodiment. Generally speaking, the metadata-based authentication system 100 operates to provide information to principals in response to requests (e.g., hypertext transfer protocol (HTTP) requests) that are received from the principals. For instance, a principal may be a user or an application. The information may include documents (Web pages, images, audio files, video files, etc.), output of executables, and/or any other suitable type of information. In accordance with example embodiments described herein, the metadata-based authentication system 100 enables a backup authentication system 108 to use an authentication package from a primary authentication system 106 to provide authentication services to principals even if the primary authentication system 106 is unable to provide valid responses to authentication requests from those principals.

As shown in FIG. 1, the metadata-based authentication system 100 includes a client device 102, a proxy system 104, the primary authentication system 106, the backup authentication system 108, a resource provider 110, and a network 112. Communication among the client device 102, the proxy system 104, the primary authentication system 106, the backup authentication system 108, and the resource provider 110 is carried out over the network 112 using well-known network communication protocols. The network 112 may be a wide-area network (e.g., the Internet), a local area network (LAN), another type of network, or a combination thereof.

The client device 102 is a processing system that is capable of communicating directly or indirectly with the proxy system 104, the primary authentication system 106, the backup authentication system 108, and the resource provider 110. An example of a processing system is a system that includes at least one processor that is capable of manipulating data in accordance with a set of instructions. For instance, a processing system may be a computer, a personal digital assistant, etc. The client device 102 is configured to provide authentication requests to the primary authentication system 106 and/or the backup authentication system 108 (e.g., via the proxy system 104) for requesting authentication artifacts that may be used to access resources provided by the resource provider 110. Examples of a resource include but are not limited to a document (Web page, image, audio file, video file, etc.) and an output of an executable. For instance, a user may initiate a request to access a resource (a.k.a. a resource request) using a client (e.g., a Web browser, Web crawler, or other type of client) deployed on the client device 102 that is owned by or otherwise accessible to the user. It will be recognized that the resource request need not necessarily be initiated by a user of the client device 102. For instance, the resource request may be initiated by an application that executes on the client device 102.

Regardless, when the client device 102 detects initiation of the resource request, the client device 102 may seek and obtain an authentication artifact (e.g., an ID token and/or an access token) from the primary authentication system 106 or the backup authentication system 108. For example, the client device 102 may provide credential(s) of the principal to the primary authentication system 106 or the backup authentication system 108 to obtain the authentication artifact. In accordance with this example, the client device 102 may receive the authentication artifact after the primary authentication system 106 or the backup authentication system 108 validates the identity and credential(s) of the principal. Upon receipt of the authentication artifact, the client device 102 may forward the authentication artifact to the resource provider 110 to gain access to the requested resource. In accordance with some example embodiments, the client device 102 is capable of accessing domains (e.g., Web sites) hosted by the resource provider 110, so that the client device 102 may access information that is available via the domains. Such domain may include Web pages, which may be provided as hypertext markup language (HTML) documents and objects (e.g., files) that are linked therein, for example.

The client device 102 may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like.

Each of the proxy system 104, the primary authentication system 106, the backup authentication system 108, and the resource provider 110 is a processing system that is capable of communicating directly or indirectly with the client device 102. For instance, the primary authentication system 106 and the backup authentication system 108 may communicate with the client device 102 via the proxy system 104, as discussed in further detail below.

The proxy system 104 serves as an intermediary between the client device 102 and the primary authentication system 106 and between the client device 102 and the backup authentication system 108. For instance, the proxy system 104 may intercept authentication requests that are sent from the client device 102 toward the primary authentication system 106 or from the client device 102 toward the backup authentication system 108. The proxy system 104 may forward each authentication request toward its intended destination (e.g., the primary authentication system 106 or the backup authentication system 108, as identified in the authentication request), or the proxy system 104 may route the authentication request to another destination (e.g., whichever of the primary authentication system 106 and the backup authentication system 108 is not identified in the authentication request), depending on circumstances. For instance, the proxy system 104 may be configured to route authentication requests to the primary authentication system 106 as a default destination. The proxy system 104 may be configured to route an authentication request to the backup authentication system 108 based on (e.g., based at least in part on) the primary authentication system 106 being incapable of providing a valid response to the authentication request.

The primary authentication system 106 is configured to selectively provide authentication artifacts in response to authentication requests that are received by the primary authentication system 106 based on one or more criteria. For instance, the primary authentication system 106 may verify a credential of a principal that is included in an authentication request and compare a first principal identifier that is included in the authentication request and a second principal identifier that is associated with an authentication artifact to determine whether the authentication artifact is to be provided in response to the authentication request. The primary authentication system 106 may be configured to provide the authentication artifact based on the credential of the principal being verified and the first principal identifier corresponding to (e.g., matching, being same as) the second principal identifier. The primary authentication system 106 may be configured to not provide the authentication artifact based on the credential of the principal not being verified and/or the first principal identifier not corresponding to the second principal identifier.

The primary authentication system 106 is further configured to generate an authentication package to be provided to the backup authentication system 108. For instance, the primary authentication system 106 may provide the authentication package to the backup authentication system 108 while the primary authentication system 106 is capable of providing valid responses to authentication requests. The authentication package may enable the backup authentication system 108 to generate valid responses to authentication requests based on the primary authentication system 106 becoming unable to do so. The primary authentication system 106 may be unable to provide valid responses to authentication requests for any of a variety of reasons, including but not limited to the primary authentication system 106 being inoperable or unreachable; a load of the primary authentication system 106 being greater than or equal to a load threshold; a dependency of the primary authentication system 106 that includes information (e.g., information about the principal) that is necessary for authentication being incapable of providing a valid response to a request for the information from the primary authentication system 106; performance of the primary authentication system 106 being less than or equal to a performance threshold (e.g., response time or delay being greater than or equal to a threshold); the primary authentication system 106 generating a designated error code; an engineer pressing a button to indicate that the primary authentication system 106 is incapable of providing a valid response to authentication requests; a criterion for establishing a connection between the proxy system 104 and the primary authentication system 106 not being satisfied; functionality of the primary authentication system 106 being blocked due to a security issue; a number of errors experienced by the primary authentication system 106 being greater than or equal to an error threshold; and the primary authentication system 106 being unreachable a number of times that is greater than or equal to a threshold number of times.

The authentication package (e.g., an authentication artifact therein) may be valid (e.g., usable by the backup authentication system 108 for purposes of authenticating the principal) for a designated period of time. Accordingly, the authentication package may expire at the end of the designated period of time. The primary authentication system 106 may periodically generate and provide new authentication packages to the backup authentication system 108. For instance, the primary authentication system 106 may provide each successive authentication package to the backup authentication system 108 prior to expiration of the preceding authentication package. This may ensure that the backup authentication system 108 continuously has a valid authentication package with which the backup authentication system 108 may authenticate the principal. For instance, the primary authentication system 106 may provide a new authentication package to the backup authentication system 108 at any suitable rate (e.g., once per day, no more frequently than once per day, or once every two days). Each new authentication package may be valid for any suitable period of time (e.g., two days, three days, or four days).

The backup authentication system 108 is configured to selectively provide authentication artifacts in response to authentication requests that are received by the backend authentication system 108 based on one or more criteria. For instance, the backend authentication system 108 may verify a credential of a principal that is included in an authentication request and compare a first principal identifier that is included in an authentication request and a second principal identifier that is associated with an authentication artifact to determine whether the authentication artifact is to be provided in response to the authentication request. The backend authentication system 108 may be configured to provide the authentication artifact based on the credential of the principal being verified and the first principal identifier corresponding to the second principal identifier. The backend authentication system 108 may be configured to not provide the authentication artifact based on the credential of the principal not being verified and/or the first principal identifier not corresponding to the second principal identifier.

The backup authentication system 108 includes metadata-based authentication logic 114. The metadata-based authentication logic 114 is configured to store the authentication package that is received from the primary authentication system 106. The authentication package includes an authentication artifact and metadata that is associated with the authentication artifact. The authentication artifact is signed with a cryptographic key by the primary authentication system 106. It should be noted that the primary authentication system 106 may be the only entity that is capable of signing authentication artifacts with the cryptographic key. For example, the backup authentication system 108 may not be capable of signing authentication artifacts with the cryptographic key. In accordance with this example, the backup authentication system 108 may not have access to the cryptographic key. The authentication artifact includes claim(s) that are usable to authenticate a principal. The metadata includes credential verification information that is usable to verify a credential of the principal. The metadata further includes a first principal identifier that identifies the principal. The metadata-based authentication logic 114 is further configured to receive a request to authenticate the principal. The request to authenticate the principal includes a second principal identifier that identifies the principal. The metadata-based authentication logic 114 is further configured to authenticate the principal by verifying the credential of the principal, which is included in the request to authenticate the principal, using the credential verification information and further by determining that the first principal identifier, which is included in the metadata, corresponds to the second principal identifier, which is included in the request to authenticate the principal, based at least in part on the request requesting authentication of the principal.

The metadata-based authentication logic 114 may be implemented in various ways to use an authentication package from the primary authentication system 106 to authenticate a principal, including being implemented in hardware, software, firmware, or any combination thereof. For example, the metadata-based authentication logic 114 may be implemented as computer program code configured to be executed in one or more processors. In another example, at least a portion of the metadata-based authentication logic 114 may be implemented as hardware logic/electrical circuitry. For instance, at least a portion of the metadata-based authentication logic 114 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The primary authentication system 106 and the backup authentication system 108 may be incorporated into a cloud computing service, though the scope of the example embodiments is not limited in this respect. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc.

The resource provider 110 is configured to selectively provide access to a resource depending on whether a requisite authentication artifact is received by the resource provider 110. For instance, the resource provider 110 may receive a request to access the resource from the client device 102. The request may include an authentication artifact that the client device received from the primary authentication system 106 or the backup authentication system 108. The resource provider 110 may verify the authentication artifact (e.g., decrypt the authentication artifact or compare the authentication artifact to a reference authentication artifact to determine that the client device 102 is to be granted access to the resource). The resource provider 110 may be configured to grant the client device 102 access to the resource based on the authentication artifact being verified. The resource provider 110 may be configured to deny the client device 102 access to the resource based on the authentication artifact not being verified.

Figure 2:
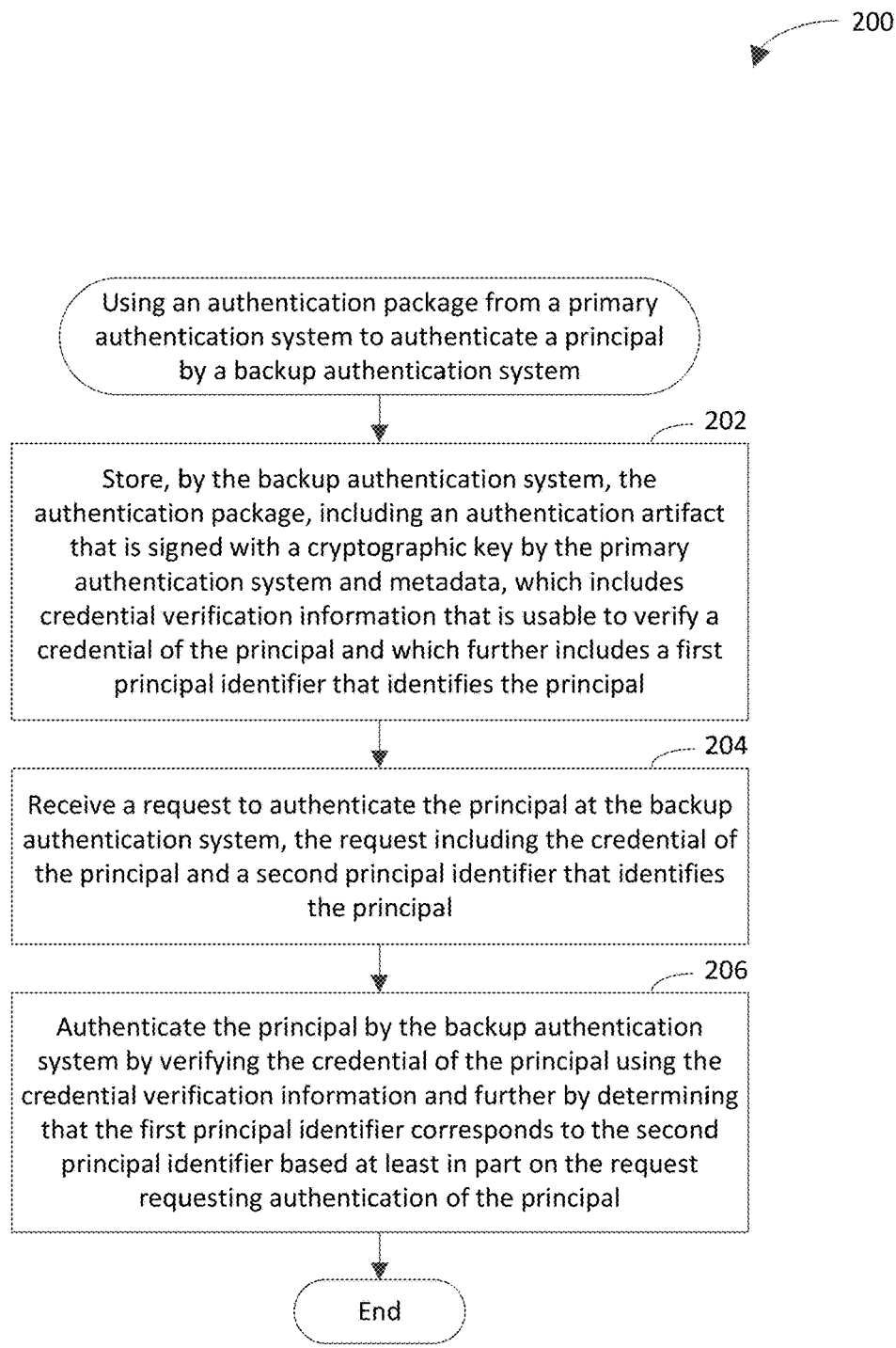
FIGS. 2-4 depict flowcharts of example methods for using an authentication package from a primary authentication system to authenticate a principal by a backup authentication system in accordance with embodiments.
Figure 3:
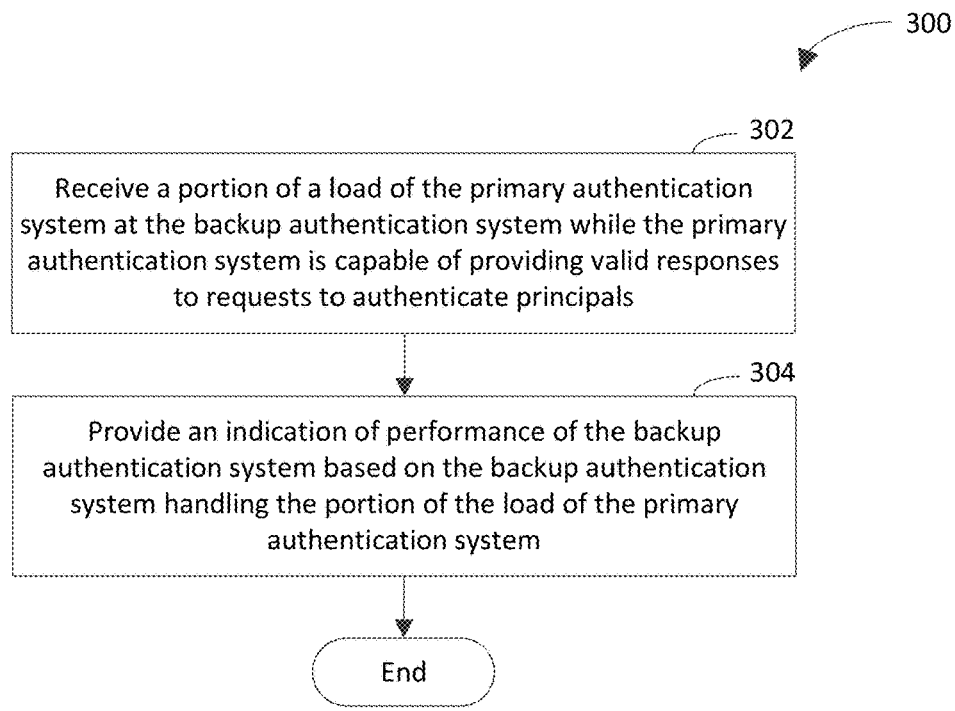
Figure 4:
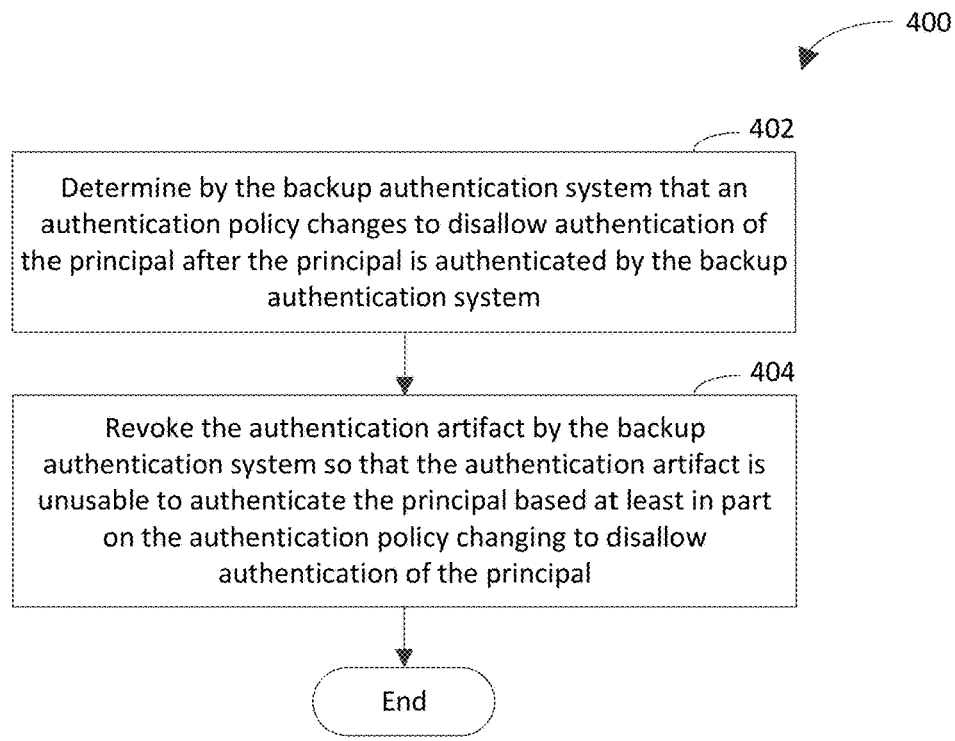
Figure 5:
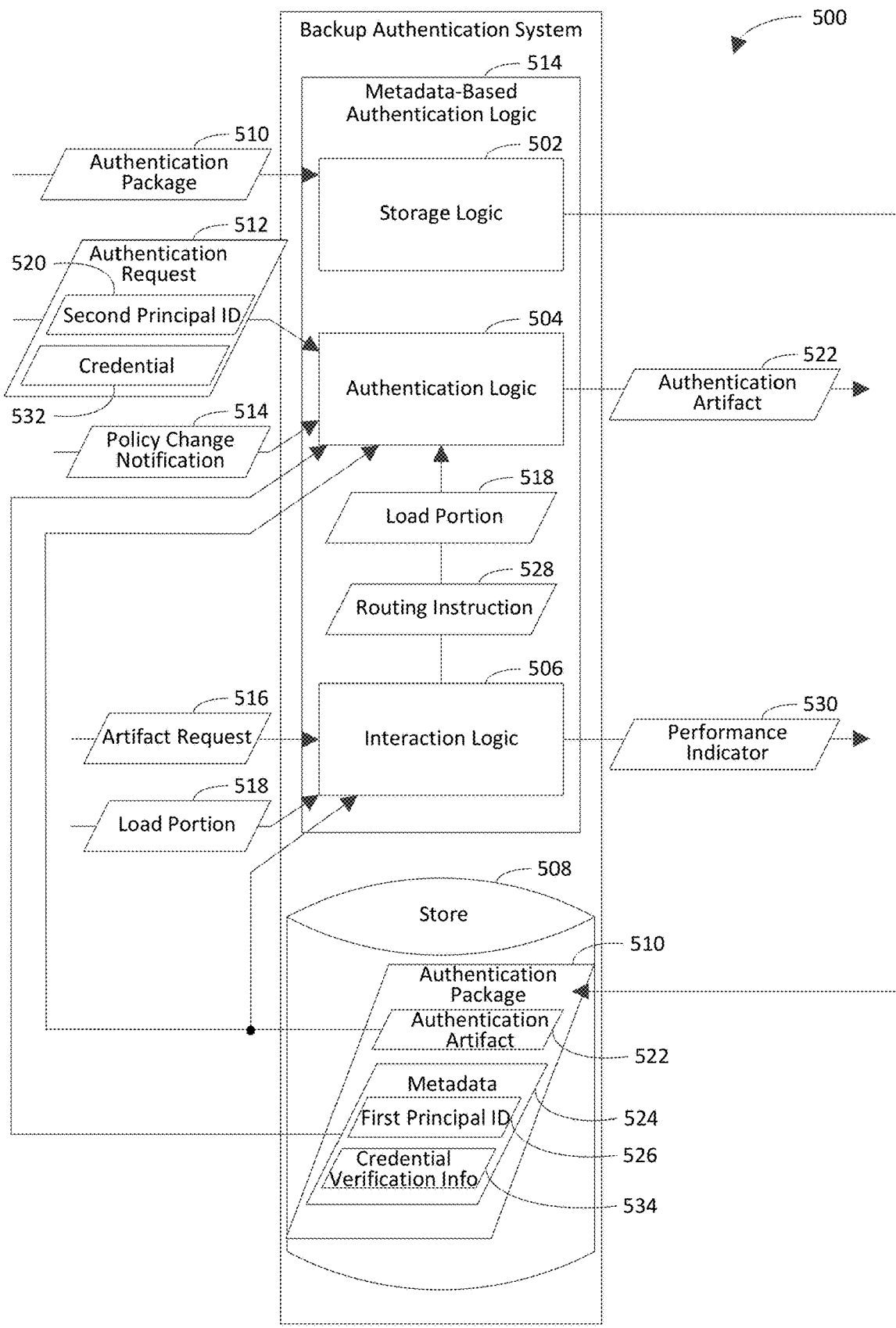
FIG. 5 is a block diagram of an example implementation of a backup authentication system shown in FIG. 1 in accordance with an embodiment.

FIGS. 2-4 depict flowcharts 200, 300, and 400 of example methods for using an authentication package from a primary authentication system to authenticate a principal by a backup authentication system in accordance with embodiments. Flowcharts 200, 300, and 400 may be performed by the backup authentication system 108 shown in FIG. 1, for example. For illustrative purposes, flowcharts 200, 300, and 400 are described with respect to backup authentication system 500 shown in FIG. 5, which is an example implementation of the backup authentication system 108. As shown in FIG. 5, the backup authentication system 500 includes metadata-based authentication logic 514 and a store 508. The metadata-based authentication logic 514 includes storage logic 502, authentication logic 504, and interaction logic 506. The store 508 may be any suitable type of store. One type of store is a database. For instance, the store 508 may be a relational database, an entity-relationship database, an object database, an object relational database, an extensible markup language (XML) database, etc. The store 508 is shown to store an authentication package 510. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, the authentication package is stored by the backup authentication system. For example, the authentication package may be received by the backup authentication system directly from the primary authentication system (e.g., without being intercepted by another entity). In another example, the authentication package may be received by the backup authentication system indirectly from the primary authentication system. In accordance with this example, the authentication package may be received via a proxy system (e.g., proxy system 104 in FIG. 1) or from a store in which the primary authentication system stores the authentication package).

The authentication package includes an authentication artifact, which is signed with a cryptographic key by the primary authentication system and which includes one or more claims that are usable to authenticate the principal. For instance, the authentication artifact may indicate an identity of the principal and/or an access permission of the principal. An access permission of the principal indicates whether the principal is authorized to perform an action (e.g., access, modify, delete) with regard to a resource. The principal may be any suitable entity that is capable of identifying itself. For instance, the principal may be a user (e.g., a user of the client device 102), an application (e.g., an application that executes on the client device 102), or a computing device (e.g., the client device 102). The authentication artifact may be an authentication token, a security assertion markup language (SAML) assertion, etc. that is generated by the primary authentication system based on (e.g., using) a cryptographic key. For example, the cryptographic key on which the authentication artifact is based may be controlled by the primary authentication system. In accordance with this example, the cryptographic key may be owned by or under exclusive control of the primary authentication system. The cryptographic key on which the authentication artifact is based and the cryptographic key with which the authentication artifact is signed may be same or different. Any one or more of the claim(s) in the authentication artifact may be configured to enable (e.g., trigger) authentication of the principal. It will be recognized that security and validation checks may be performed on the authentication artifact by the backup authentication system to verify that the authentication artifact is not corrupted when it is received from the primary authentication system and that the authentication artifact is trustworthy to the principal.

The authentication package further includes metadata associated with the authentication artifact. The metadata includes credential verification information that is usable to verify a credential of the principal. For instance, the credential verification information may identify the credential of the principal in a secure manner and include enough information to enable the backup authentication system to verify the credential. The metadata further includes a first principal identifier that identifies the principal. For instance, the first principal identifier may be a username of the principal or a token that is issued to the principal by the primary authentication system. The metadata may indicate what the authentication artifact is, what the authentication artifact contains, how the authentication artifact is to be stored, a lifetime (e.g., duration of usability or effectiveness) of the authentication artifact, and so on. The authentication package may be signed with a second cryptographic key by the primary authentication system and/or encrypted by the primary authentication system.

The backup authentication system may be isolated from the primary authentication system. For example, the primary authentication system and the backup authentication system may be in different clouds and/or in different parts of the world. For instance, a cloud that hosts the primary authentication system and a cloud that hosts the backup authentication system may be decorrelated (e.g., have no reciprocal relationship). In another example, the cloud that hosts the primary authentication system may be located (e.g., contained) in a first geographical region, and the cloud that hosts the backup authentication system may be located in a second geographical region that is different from the first geographical region. For instance, the first and second geographical regions may be first and second continents, first and second countries, first and second states, first and second counties, or first and second cities.

The authentication package may be stored by the backup authentication system in accordance with a federated identity protocol, though the example embodiments are not limited in this respect. Examples of a federated identity protocol include but are not limited to an OAuth 2.0 protocol, an Open ID Connect (OIDC) protocol, a SAML protocol, a Web Services Federation (WS-Federation) protocol, and a WS-Trust protocol.

In an example implementation, the storage logic 502 stores the authentication package 510 in the store 508. The authentication package 510 includes an authentication artifact 522 and metadata 524, which is associated with the authentication artifact 522. The authentication artifact 522 is signed with a cryptographic key by the primary authentication system and includes claim(s) that are usable to authenticate the principal. The metadata 524 includes credential verification information 534 that is usable to verify a credential 532 of the principal. The metadata 524 further includes a first principal identifier (ID) 526 that identifies the principal. In an example embodiment, the storage logic 502 receives an encrypted authentication package from the primary authentication system. In accordance with this embodiment, the storage logic 502 decrypts the encrypted authentication package to obtain the authentication package for storage in the store 508. In an aspect of this embodiment, the encrypted authentication package may include the authentication package encrypted with a public key of a key pair, and the storage logic 502 may decrypt the encrypted authentication package with a private key of the key pair. In another aspect of this embodiment, the encrypted authentication package may include the authentication package encrypted with a symmetric key, and the storage logic 502 may decrypt the encrypted authentication package with the symmetric key.

In an example embodiment, the authentication artifact is configured to be valid for a duration that is longer than a duration for which other authentication artifacts, which are used by the primary authentication system to authenticate principals, are configured to be valid. For instance, the duration for which the authentication artifact is configured to be valid may be multiple days (e.g., two days, three days, or four days); whereas, the other authentication artifacts may be configured to be valid for one day or less than one day (e.g., three hours, two hours, or one hour).

In another example embodiment, storing the authentication package at step 202 includes storing the authentication package, including the authentication artifact as modified by the primary authentication system to remove or modify at least one claim from a plurality of claims that the authentication artifact initially includes, by the backup authentication system. In an elapsed time example, the modification of the authentication artifact to remove or modify the at least one claim may be based at least in part on a duration of time that has elapsed since generation of the authentication artifact by the primary authentication system. In accordance with this example, the at least one claim that is removed or modified may no longer be valid or may have a likelihood of being valid that is less than a likelihood threshold based on the duration of time that has elapsed. For instance, the at least one claim may have become invalid due to the at least one claim being compromised or being false due to changed circumstances. Accordingly, the modification of the authentication artifact may be based at least in part on the at least one claim that is removed or modified being invalid or having the likelihood of being valid that is less than the likelihood threshold.

At step 204, a request to authenticate the principal is received at the backup authentication system. The request includes the credential of the principal and further includes a second principal identifier that identifies the principal. For instance, the credential may be issued to the principal by the primary authentication system. The credential may be encrypted and/or cryptographically signed (e.g., tamper-proof) by the primary authentication system, though the scope of the example embodiments is not limited in this respect.

The credential of the principal may be any suitable type of credential, including but not limited to a biometric-based credential, a behaviometric-based credential, a knowledge-based credential, and an ownership-based credential. A biometric-based credential is a measurement or calculation of a physiological characteristic of a user. Examples of a physiological characteristic of a user include but are not limited to a face, hand, palm veins, palmprint, fingerprint, DNA, iris, and retina of the user. A measurement or calculation of a characteristic may indicate one or more dimensions of the characteristic (e.g., one or more dimensions of a feature of the characteristic or a spacing between multiple features of the characteristic). For instance, if a physiological characteristic of a user is the user's fingerprint, the biometric-based credential associated with the user's fingerprint may include a mapping of the ridges in the fingerprint. A behaviometric-based credential is a credential that indicates a pattern of behavior of a user. Examples of a pattern of behavior of a user include but are not limited to a voice, gait, and pattern of key press intervals (a.k.a. typing rhythm) of the user. A knowledge-based credential is something a user knows. Examples of a knowledge-based credential include but are not limited to a password or a portion thereof, pass phrase, personal identification number (PIN), challenge response, and security question. An ownership-based credential is a credential obtained from something a user has. Examples of something the user has (or may have) include but are not limited to a smartcard, wrist band, ID card, security token, device implanted under the user's skin, software token, cell phone (having a built-in hardware token or storing a software token), and hardware authentication device (e.g., YubiKey®).

The request to authenticate the principal may include a single communication or multiple communications. For example, the credential of the principal and the second principal identifier may be received simultaneously by the backup authentication system in a single communication. For instance, the credential may include the second principal identifier (e.g., an encrypted version of the second principal identifier). In another example, the credential of the principal and the second principal identifier may be received in separate communications. In accordance with this example, a first communication from the principal may include the second principal identifier. In further accordance with this example, the backup authentication system may provide an inquiry (e.g., via a user interface) to the principal, requesting the credential as a result of receiving the first communication. In further accordance with this example, the backup authentication system may receive a second communication that includes the credential from the principal in response to the inquiry.

In an example implementation, the authentication logic 504 receives an authentication request 512 to authenticate the principal. The authentication request 512 includes the credential 532 of the principal and a second principal identifier (ID) 520 that identifies the principal.

At step 206, the principal is authenticated by the backup authentication system by verifying the credential of the principal, which is included in the request to authenticate the principal, using the credential verification information and further by determining that the first principal identifier, which is included in the metadata, corresponds to the second principal identifier, which is included in the request to authenticate the principal, based at least in part on the request requesting authentication of the principal. The principal may be authenticated by the backup authentication system in accordance with a federated identity protocol, though the example embodiments are not limited in this respect. In an example implementation, the authentication logic 504 authenticates the principal by verifying the credential 532 of the principal, which is included in the authentication request 512, using the credential verification information 534 and further by determining that the first principal identifier 526, which is included in the metadata 524, corresponds to the second principal identifier 520, which is included in the authentication request 512, based at least in part on the authentication request 512 requesting authentication of the principal. For example, the authentication logic 504 may retrieve the metadata 524 from the store 508 to make the determination. In another example, the authentication logic 504 may make the determination as a result of comparing the first principal identifier 526 and the second principal identifier 520.

The credential of the principal may be verified using the credential verification information in any of a variety of ways. For example, the credential may be an encrypted credential (e.g., refresh token or password). In an aspect of this example, the credential verification information may include a key that is configured to decrypt the encrypted credential. In another aspect of this example, the credential verification information may include a description of the credential, which enables the backup authentication system to identify the key that is to be used to decrypt the encrypted credential. In further accordance with this example, the credential of the principal may be verified by decrypting the encrypted credential with the key that is included in the credential verification information or that is identified based on the credential verification information to reveal the unencrypted credential. In an example embodiment, the key that is used to decrypt the encrypted credential is possessed by only the primary authentication system and the backup authentication system. In accordance with this embodiment, only the primary authentication system and the backup authentication system are capable of using the key to decrypt the encrypted credential.

In another example, the credential may be an encrypted version of the second principal identifier (e.g., refresh token or password). In an aspect of this example, the credential verification information may include a key that is configured to decrypt the encrypted version of the second principal identifier. In another aspect of this example, the credential verification information may include a description of the second principal identifier, which enables the backup authentication system to identify the key that is to be used to decrypt the encrypted version of the second principal identifier. In further accordance with this example, the credential of the principal may be verified by decrypting the encrypted version of the second principal identifier with the key that is included in the credential verification information or that is identified based on the credential verification information to reveal the second principal identifier. The key that is used to decrypt the encrypted version of the second principal identifier may be possessed by only the primary and backup authentication systems such that only the primary and backup authentication systems are capable of using the key to decrypt the encrypted version of the second principal identifier, though the scope of the example embodiments is not limited in this respect.

In an example embodiment, the keys described in the examples above are usable by the backup authentication system for purposes of decryption and not for purposes of encryption. In accordance with this embodiment, the backup authentication system is not able to generate its own version of a credential using a key that is usable to decrypt an encrypted version of the credential. In another example embodiment, the keys described in the examples above are usable by the backup authentication system for purposes of decryption and for purposes of encryption. In accordance with this embodiment, the backup authentication system is able to generate its own version of a credential using a key that is usable to decrypt an encrypted version of the credential.

In yet another example, the credential of the principal may be a hashed credential (e.g., refresh token or password). In accordance with this example, the credential verification information may include a hash of the credential (or the credential that is then hashed by the backend authentication system to provide the hashed credential). Accordingly, the credential of the principal may be verified by comparing the hashed credential in the authentication request to the hashed credential that is included in or derived from the credential verification information to confirm that the aforementioned hashed credentials are same.

In the elapsed time example mentioned above with regard to step 202, authenticating the principal at step 206 is further based at least in part on the authentication artifact being modified to remove or modify the at least one claim.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes receiving the authentication package from the primary authentication system by the backup authentication system while the primary authentication system is capable of providing valid responses to requests to authenticate principals. For instance, the storage logic 502 may receive the authentication package 510 from the primary authentication system while the primary authentication system is capable of providing valid responses to requests to authenticate principals. In accordance with this embodiment, the request to authenticate the principal is received at step 204 as a result of the primary authentication system becoming incapable of providing a valid response to the request to authenticate the principal.

The primary authentication system may become incapable of providing a valid response to the request to authenticate the principal in any of a variety of ways, including but not limited to becoming inoperable or unreachable; having a load that is greater than or equal to a load threshold; having a dependency that includes information that is necessary for authentication and that is incapable of providing a valid response to a request for the information from the primary authentication system; having a performance that is less than or equal to a performance threshold (e.g., having a response time or delay that is greater than or equal to a threshold); generating a designated error code; being identified by an engineer as being incapable of providing a valid response to the authentication request; a criterion for establishing a connection between the proxy system and the primary authentication system not being satisfied; functionality of the primary authentication system being blocked due to a security issue; a number of errors experienced by the primary authentication system being greater than or equal to an error threshold; and being unreachable a number of times that is greater than or equal to a threshold number of times.

For instance, the authentication package may be received from the primary authentication system by the backup authentication system while the primary authentication system is reachable by a proxy system (e.g., proxy system 104) that is coupled between the principal and the primary authentication system, and the request to authenticate the principal may be received at step 204 as a result of the primary authentication system not being reachable by the gateway.

In another example embodiment, the method of flowchart 200 further includes receiving a portion of a load of the primary authentication system at the backup authentication system based at least in part on the load of the primary authentication system being greater than or equal to a load threshold. For example, the interaction logic 506 may receive a load portion 518, including the portion of the load of the primary authentication system. In accordance with this example, the interaction logic 506 may forward the load portion 518 to the authentication logic 504 for processing. In further accordance with this example, the load portion 518 may include authentication requests that were initially directed toward the primary authentication system, and the authentication logic 504 may process the load portion 518 by providing valid responses to at least some (e.g., all) of the authentication requests included in the load portion 518. For instance, the authentication requests in the load portion 518 may identify the primary authentication system as an intended recipient of the authentication requests.

In yet another example embodiment, the metadata associated with the authentication artifact indicates a range of internet protocol (IP) addresses in which an IP address of the principal is to be included as a criterion for authentication of the principal using the authentication package. For instance, the metadata 524 may indicate the range of IP addresses. In accordance with this embodiment, the method of flowchart 200 further includes comparing the IP address of the principal to the range of IP addresses by the backup authentication system to determine that the IP address of the principal is included in the range of IP addresses. For instance, the authentication logic 504 may compare the IP address of the principal to the range of IP addresses to determine that the IP address of the principal is included in the range of IP addresses. In further accordance with this embodiment, authenticating the principal at step 206 is based at least in part on the IP address of the principal being included in the range of IP addresses.

In still another example embodiment, the request to authenticate the principal includes a source identifier, which indicates that the request is from a proxy system (e.g., a designated proxy system). For instance, the source identifier may include (e.g., be) an IP address of the proxy system. In accordance with this embodiment, the method of flowchart 200 further includes analyzing the request to determine that the source identifier indicates that the request is from the proxy system. For example, the authentication logic 504 may analyze the authentication request 512 to determine that the source identifier indicates that the authentication request 512 is from the proxy system. In accordance with this example, the authentication logic 504 may compare the source identifier and a reference identifier associated with the proxy system to determine whether the source identifier in the request corresponds to the reference identifier. In further accordance with this example, the authentication logic 504 may determine that the source identifier indicates that the authentication request 512 is from the proxy system based on the source identifier corresponding to the reference identifier. In further accordance with this embodiment, authenticating the principal at step 206 is further based at least in part on the request being from the proxy system. For example, the request being from the proxy system may be a prerequisite for performing step 206. In accordance with this example, if a determination had been made that the request is not from the proxy system, step 206 may not have been performed.

In another example embodiment, the method of flowchart 200 further includes providing the authentication artifact to the principal as a result of the principal being authenticated. For instance, the authentication logic 504 may provide the authentication artifact 522 to the principal as a result of the principal being authenticated.

In yet another example embodiment, the method of flowchart 200 further includes one or more of the steps shown in flowchart 300 of FIG. 3. As shown in FIG. 3, the method of flowchart 300 begins at step 302. In step 302, a portion of a load of the primary authentication system is received at the backup authentication system while the primary authentication system is capable of providing valid responses to requests to authenticate principals. In an example implementation, the interaction logic 506 receives the load portion 518, which includes the portion of the load of the primary authentication system, while the primary authentication system is capable of providing valid responses to requests to authenticate principals.

At step 304, an indication of performance of the backup authentication system is provided based on the backup authentication system handling the portion of the load of the primary authentication system. In an example implementation, the interaction logic 506 generates a performance indicator 530, which indicates performance of the backup authentication system 500, based on the backup authentication system 500 handling the load portion 518. For instance, the load portion 518 may include authentication requests that were initially directed toward the primary authentication system, and the backup authentication system 500 (e.g., the authentication logic 504 therein) may handle the load portion 518 by providing valid responses to at least some (e.g., all) of the authentication requests included in the load portion 518.

In still another example embodiment, the method of flowchart 200 further includes one or more of the steps shown in flowchart 400 of FIG. 4. As shown in FIG. 4, the method of flowchart 400 begins at step 402. In step 402, a determination is made by the backup authentication system that an authentication policy changes to disallow authentication of the principal after the principal is authenticated by the backup authentication system. In an example implementation, the authentication logic 504 determines that the authentication policy changes to disallow authentication of the principal after the principal is authenticated by the backup authentication system 500 (e.g., the authentication logic 504 therein). For instance, the authentication logic 504 may make the determination based on receipt of a policy change notification 514, which indicates that the authentication policy changes to disallow authentication of the principal.

At step 404, the authentication artifact is revoked by the backup authentication system so that the authentication artifact is unusable to authenticate the principal based at least in part on the authentication policy changing to disallow authentication of the principal. In an example implementation, the authentication logic 504 revokes the authentication artifact 522 so that the authentication artifact 522 is unusable to authenticate the principal based at least in part on the authentication policy changing to disallow authentication of the principal.

It will be recognized that the backup authentication system 500 may not include one or more of the storage logic 502, the authentication logic 504, and/or the interaction logic 506. Furthermore, the backup authentication system 500 may include components in addition to or in lieu of the storage logic 502, the authentication logic 504, and/or the interaction logic 506.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the metadata-based authentication logic 114, the storage logic 502, the authentication logic 504, the interaction logic 506, the metadata-based authentication logic 514, flowchart 200, flowchart 300, and/or flowchart 400 may be implemented in hardware, software, firmware, or any combination thereof.

For example, any one or more of the metadata-based authentication logic 114, the storage logic 502, the authentication logic 504, the interaction logic 506, the metadata-based authentication logic 514, flowchart 200, flowchart 300, and/or flowchart 400 may be implemented, at least in part, as computer program code configured to be executed in one or more processors.

In another example, any one or more of the metadata-based authentication logic 114, the storage logic 502, the authentication logic 504, the interaction logic 506, the metadata-based authentication logic 514, flowchart 200, flowchart 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
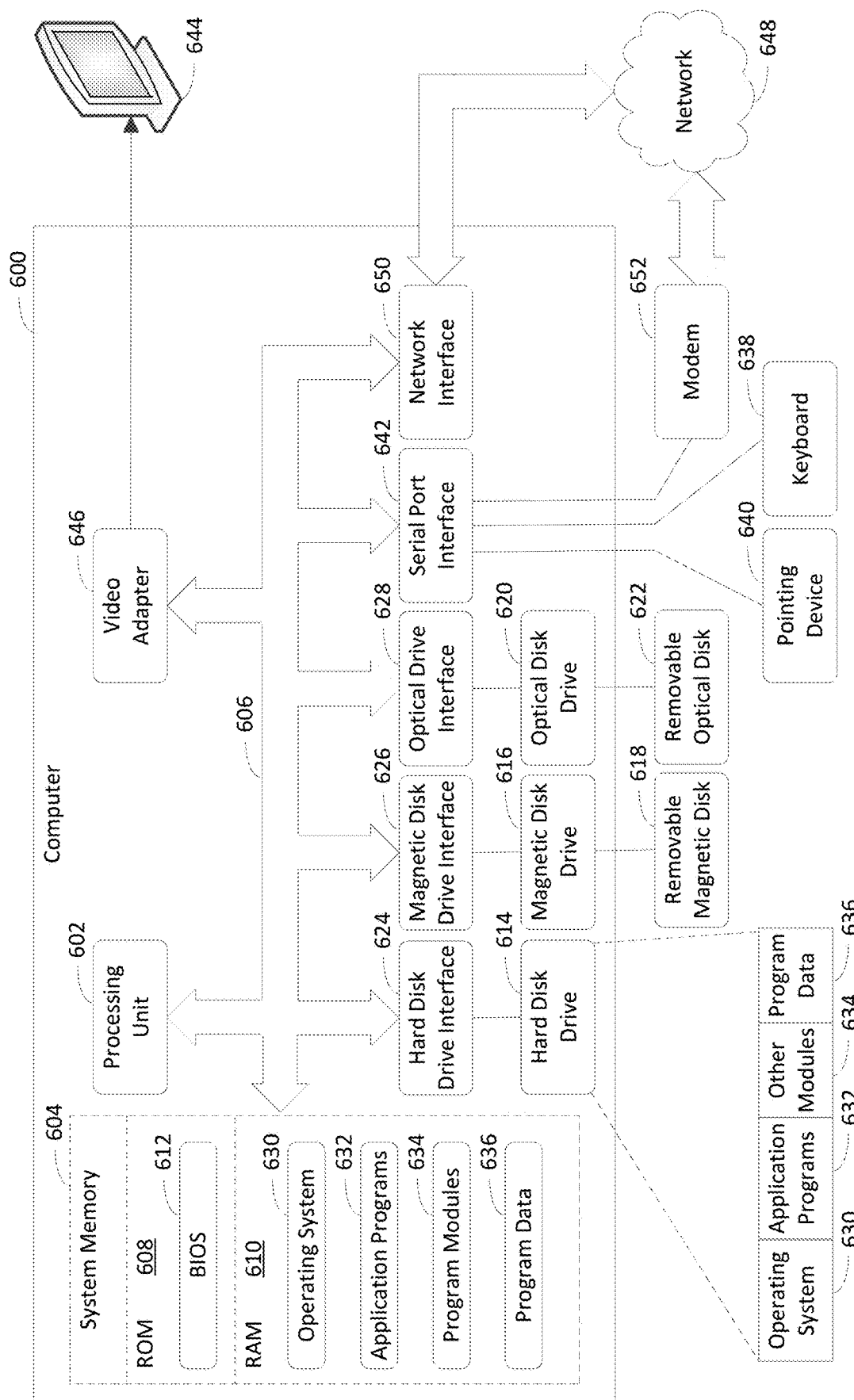
FIG. 6 depicts an example computer in which embodiments may be implemented.

III. Further Discussion of Some Example Embodiments (A1) An example backup authentication system (FIG. 1, 108; FIG. 5, 500; FIG. 6, 600) to use an authentication package (FIG. 5, 510) from a primary authentication system (FIG. 1, 106) to authenticate a principal comprises a memory (FIG. 6, 604, 608, 610) and one or more processors (FIG. 6, 602) coupled to the memory. The one or more processors are configured to store (FIG. 2, 202) the authentication package from the primary authentication system in the memory. The authentication package includes an authentication artifact (FIG. 5, 522), which is signed with a cryptographic key by the primary authentication system and which includes one or more claims that are usable to authenticate the principal, and further includes metadata (FIG. 5, 524) associated with the authentication artifact. The metadata includes credential verification information (FIG. 5, 534) that is usable to verify a credential (FIG. 5, 532) of the principal. The metadata further includes a first principal identifier (FIG. 5, 526) that identifies the principal. The one or more processors are further configured to authenticate (FIG. 2, 206) the principal by verifying the credential of the principal, which is included in a received request (FIG. 5, 512) to authenticate the principal, using the credential verification information and further by determining that the first principal identifier, which is included in the metadata, corresponds to a second principal identifier (FIG. 5, 520), which identifies the principal and which is included in the request to authenticate the principal, based at least in part on the request requesting authentication of the principal.

(A2) In the example backup authentication system of A1, wherein the one or more processors are further configured to: receive the authentication package from the primary authentication system while the primary authentication system is capable of providing valid responses to requests to authenticate principals; and receive the request to authenticate the principal as a result of the primary authentication system becoming incapable of providing a valid response to the request to authenticate the principal.

(A3) In the example backup authentication system of any of A1-A2, wherein the one or more processors are configured to store the authentication package, including the authentication artifact as modified by the primary authentication system to remove or modify at least one claim from a plurality of claims that the authentication artifact initially includes.

(A4) In the example backup authentication system of any of A1-A3, wherein the one or more processors are further configured to receive a portion of a load of the primary authentication system based at least in part on the load of the primary authentication system being greater than or equal to a load threshold.

(A5) In the example backup authentication system of any of A1-A4, wherein the one or more processors are further configured to: receive a portion of a load of the primary authentication system while the primary authentication system is capable of providing valid responses to requests to authenticate principals; and provide an indication of performance of the backup authentication system based on the backup authentication system handling the portion of the load of the primary authentication system.

(A6) In the example backup authentication system of any of A1-A5, wherein the one or more processors are further configured to: determine that an authentication policy changes to disallow authentication of the principal after the principal is authenticated by the backup authentication system; and revoke the authentication artifact so that the authentication artifact is unusable to authenticate the principal based at least in part on the authentication policy changing to disallow authentication of the principal.

(A7) In the example backup authentication system of any of A1-A6, wherein the metadata associated with the authentication artifact indicates a range of internet protocol (IP) addresses in which an IP address of the principal is to be included as a criterion for authentication of the principal using the authentication package; and wherein the one or more processors are configured to: compare the IP address of the principal to the range of IP addresses to determine that the IP address of the principal is included in the range of IP addresses; and authenticate the principal based at least in part on the IP address of the principal being included in the range of IP addresses.

(A8) In the example backup authentication system of any of A1-A7, wherein the authentication artifact is configured to be valid for a duration that is longer than a duration for which other authentication artifacts, which are used by the primary authentication system to authenticate principals, are configured to be valid.

(A9) In the example backup authentication system of any of A1-A8, wherein the request to authenticate the principal includes a source identifier, which indicates that the request is from a proxy system; and wherein the one or more processors are configured to: analyze the request to determine that the source identifier indicates that the request is from the proxy system; and authenticate the principal further based at least in part on the request being from the proxy system.

(B1) An example method of using an authentication package (FIG. 5, 510) from a primary authentication system (FIG. 1, 106) to authenticate a principal by a backup authentication system (FIG. 1, 108; FIG. 5, 500; FIG. 6, 600) comprises storing (FIG. 2, 202) the authentication package by the backup authentication system. The authentication package includes an authentication artifact (FIG. 5, 522), which is signed with a cryptographic key by the primary authentication system and which includes one or more claims that are usable to authenticate the principal, and further includes metadata (FIG. 5, 524) associated with the authentication artifact. The metadata includes credential verification information (FIG. 5, 534) that is usable to verify a credential (FIG. 5, 532) of the principal. The metadata further includes a first principal identifier (FIG. 5, 526) that identifies the principal. The method further comprises receiving (FIG. 2, 204) a request (FIG. 5, 512) to authenticate the principal at the backup authentication system, the request including the credential of the principal and further including a second principal identifier (FIG. 5, 520) that identifies the principal. The method further comprises authenticating (FIG. 2, 206) the principal by the backup authentication system by verifying the credential of the principal, which is included in the request to authenticate the principal, using the credential verification information and further by determining that the first principal identifier, which is included in the metadata, corresponds to the second principal identifier, which is included in the request to authenticate the principal, based at least in part on the request requesting authentication of the principal.

(B2) In the method of B1, further comprising: receiving the authentication package from the primary authentication system by the backup authentication system while the primary authentication system is capable of providing valid responses to requests to authenticate principals; wherein receiving the request to authenticate the principal comprises:

receiving the request to authenticate the principal at the backup authentication system as a result of the primary authentication system becoming incapable of providing a valid response to the request to authenticate the principal.

(B3) In the method of any of B1-B2, wherein storing the authentication package comprises: storing the authentication package, including the authentication artifact as modified by the primary authentication system to remove or modify at least one claim from a plurality of claims that the authentication artifact initially includes, by the backup authentication system.

(B4) In the method of any of B1-B3, further comprising: receiving a portion of a load of the primary authentication system at the backup authentication system based at least in part on the load of the primary authentication system being greater than or equal to a load threshold.

(B5) In the method of any of B1-B4, further comprising: receiving a portion of a load of the primary authentication system at the backup authentication system while the primary authentication system is capable of providing valid responses to requests to authenticate principals; and providing an indication of performance of the backup authentication system based on the backup authentication system handling the portion of the load of the primary authentication system.

(B6) In the method of any of B1-B5, further comprising: determining by the backup authentication system that an authentication policy changes to disallow authentication of the principal after the principal is authenticated by the backup authentication system; and revoking the authentication artifact by the backup authentication system so that the authentication artifact is unusable to authenticate the principal based at least in part on the authentication policy changing to disallow authentication of the principal.

(B7) In the method of any of B1-B6, wherein the metadata associated with the authentication artifact indicates a range of internet protocol (IP) addresses in which an IP address of the principal is to be included as a criterion for authentication of the principal using the authentication package; wherein the method further comprises: comparing the IP address of the principal to the range of IP addresses by the backup authentication system to determine that the IP address of the principal is included in the range of IP addresses; and wherein authenticating the principal comprises: authenticating the principal by the backup authentication system based at least in part on the IP address of the principal being included in the range of IP addresses.

(B8) In the method of any of B1-B7, wherein the authentication artifact is configured to be valid for a duration that is longer than a duration for which other authentication artifacts, which are used by the primary authentication system to authenticate principals, are configured to be valid.

(B9) In the method of any of B1-B8, wherein the request to authenticate the principal includes a source identifier, which indicates that the request is from a proxy system; wherein the method further comprises: analyzing the request to determine that the source identifier indicates that the request is from the proxy system; and wherein authenticating the principal comprises: authenticating the principal by the backup authentication system further based at least in part on the request being from the proxy system.

(C1) An example computer program product (FIG. 6, 618, 622) comprising a computer-readable storage medium having instructions recorded thereon for enabling a processor-based backup authentication system (FIG. 1, 108; FIG. 5, 500; FIG. 6, 600) to use an authentication package (FIG. 5, 510) from a primary authentication system (FIG. 1, 106) to authenticate a principal by performing operations, the operations comprise: storing (FIG. 2, 202) the authentication package at the backup authentication system. The authentication package includes an authentication artifact (FIG. 5, 522), which is signed with a cryptographic key by the primary authentication system and which includes one or more claims that are usable to authenticate the principal, and further includes metadata (FIG. 5, 524) associated with the authentication artifact. The metadata including credential verification information (FIG. 5, 534) that is usable to verify a credential (FIG. 5, 532) of the principal. The metadata further includes a first principal identifier (FIG. 5, 526) that identifies the principal. The operations further comprise: authenticating (FIG. 1, 206) the principal by verifying the credential of the principal, which is included in a received request (FIG. 5, 512) to authenticate the principal, using the credential verification information and further by determining that the first principal identifier, which is included in the metadata, corresponds to a second principal identifier (FIG. 5, 520), which identifies the principal and which is included in the request to authenticate the principal, based at least in part on the request requesting authentication of the principal.

(C2) In the example computer program product of C1, wherein the operations further comprise: determining that an authentication policy changes to disallow authentication of the principal after the principal is authenticated by the backup authentication system; and revoking the authentication artifact so that the authentication artifact is unusable to authenticate the principal based at least in part on the authentication policy changing to disallow authentication of the principal.

IV. Example Computer System

FIG. 6 depicts an example computer 600 in which embodiments may be implemented. Any one or more of the client device 102, the proxy system 104, the primary authentication system 106, the backup authentication system 108, and/or the resource provider 110 show in FIG. 1 and/or the backup authentication system 500 shown in FIG. 5 may be implemented using the computer 600, including one or more features of the computer 600 and/or alternative features. The computer 600 may be a general-purpose computing device in the form of a conventional personal computer, a mobile computer, or a workstation, for example, or the computer 600 may be a special purpose computing device. The description of the computer 600 provided herein is provided for purposes of illustration, and is not intended to be limiting. Embodiments may be implemented in further types of computer systems, as would be known to persons skilled in the relevant art(s).

As shown in FIG. 6, the computer 600 includes a processing unit 602, a system memory 604, and a bus 606 that couples various system components including the system memory 604 to the processing unit 602. The bus 606 represents one or more of any of several types of bus structures, including a memory bus or memory controller, a peripheral bus, an accelerated graphics port, and a processor or local bus using any of a variety of bus architectures. The system memory 604 includes read only memory (ROM) 608 and random access memory (RAM) 610. A basic input/output system 612 (BIOS) is stored in the ROM 608.

The computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. The hard disk drive 614, the magnetic disk drive 616, and the optical disk drive 620 are connected to the bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer 600. Although a hard disk, a removable magnetic disk, and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. The application programs 632 or the program modules 634 may include, for example, computer program logic for implementing any one or more of (e.g., at least a portion of) the metadata-based authentication logic 114, the storage logic 502, the authentication logic 504, the interaction logic 506, the metadata-based authentication logic 514, flowchart 200 (including any step of flowchart 200), flowchart 300 (including any step of flowchart 300), and/or flowchart 400 (including any step of flowchart 400), as described herein.

A user may enter commands and information into the computer 600 through input devices such as a keyboard 638 and a pointing device 640. Other input devices (not shown) may include a microphone, joystick, game pad, satellite dish, scanner, touch screen, camera, accelerometer, gyroscope, or the like. These and other input devices are often connected to the processing unit 602 through a serial port interface 642 that is coupled to the bus 606, but may be connected by other interfaces, such as a parallel port, a game port, or a universal serial bus (USB).

A display device 644 (e.g., a monitor) is also connected to the bus 606 via an interface, such as a video adapter 646. In addition to the display device 644, the computer 600 may include other peripheral output devices (not shown) such as speakers and printers.

The computer 600 is connected to a network 648 (e.g., the Internet) through a network interface or adapter 650, a modem 652, or other means for establishing communications over the network. The modem 652, which may be internal or external, is connected to the bus 606 via the serial port interface 642.

As used herein, the terms "computer program medium" and "computer-readable storage medium" are used to generally refer to media (e.g., non-transitory media) such as the hard disk associated with the hard disk drive 614, the removable magnetic disk 618, the removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including the application programs 632 and the other program modules 634) may be stored on the hard disk, magnetic disk, optical disk, ROM, or RAM. Such computer programs may also be received via the network interface 650 or the serial port interface 642. Such computer programs, when executed or loaded by an application, enable the computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A backup authentication system to use an authentication package from a primary authentication system to authenticate a principal, the backup authentication system comprising:

a memory; and one or more processors coupled to the memory, the one or more processors configured to:

store the authentication package from the primary authentication system in the memory, the authentication package including an authentication artifact, which is signed with a cryptographic key by the primary authentication system and which includes one or more claims that are usable to authenticate the principal, and further including metadata associated with the authentication artifact, the metadata including credential verification information that is usable to verify a credential of the principal, the metadata further including a first principal identifier that identifies the principal; and authenticate the principal by verifying the credential of the principal, which is included in a received request to authenticate the principal, using the credential verification information and further by determining that the first principal identifier, which is included in the metadata, corresponds to a second principal identifier, which identifies the principal and which is included in the request to authenticate the principal, based at least in part on the request requesting authentication of the principal.

2. The backup authentication system of claim 1, wherein the one or more processors are further configured to:
receive the authentication package from the primary authentication system while the primary authentication system is capable of providing valid responses to requests to authenticate principals; and
receive the request to authenticate the principal as a result of the primary authentication system becoming incapable of providing a valid response to the request to authenticate the principal.

3. The backup authentication system of claim 1, wherein the one or more processors are configured to:
store the authentication package, including the authentication artifact as modified by the primary authentication system to remove or modify at least one claim from a plurality of claims that the authentication artifact initially includes.

4. The backup authentication system of claim 1, wherein the one or more processors are further configured to:
receive a portion of a load of the primary authentication system based at least in part on the load of the primary authentication system being greater than or equal to a load threshold.

5. The backup authentication system of claim 1, wherein the one or more processors are further configured to:
receive a portion of a load of the primary authentication system while the primary authentication system is capable of providing valid responses to requests to authenticate principals; and
provide an indication of performance of the backup authentication system based on the backup authentication system handling the portion of the load of the primary authentication system.

6. The backup authentication system of claim 1, wherein the one or more processors are further configured to:
determine that an authentication policy changes to disallow authentication of the principal after the principal is authenticated by the backup authentication system; and
revoke the authentication artifact so that the authentication artifact is unusable to authenticate the principal based at least in part on the authentication policy changing to disallow authentication of the principal.

7. The backup authentication system of claim 1, wherein the metadata associated with the authentication artifact indicates a range of internet protocol (IP) addresses in which an IP address of the principal is to be included as a criterion for authentication of the principal using the authentication package; and
wherein the one or more processors are configured to:
compare the IP address of the principal to the range of IP addresses to determine that the IP address of the principal is included in the range of IP addresses; and
authenticate the principal based at least in part on the IP address of the principal being included in the range of IP addresses.

8. The backup authentication system of claim 1, wherein the authentication artifact is configured to be valid for a duration that is longer than a duration for which other authentication artifacts, which are used by the primary authentication system to authenticate principals, are configured to be valid.

9. The backup authentication system of claim 1, wherein the request to authenticate the principal includes a source identifier, which indicates that the request is from a proxy system; and
wherein the one or more processors are configured to:
analyze the request to determine that the source identifier indicates that the request is from the proxy system; and
authenticate the principal further based at least in part on the request being from the proxy system.

10. A method of using an authentication package from a primary authentication system to authenticate a principal by a backup authentication system, the method comprising:
storing the authentication package by the backup authentication system,
the authentication package including an authentication artifact, which is signed with a cryptographic key by the primary authentication system and which includes one or more claims that are usable to authenticate the principal, and further including metadata associated with the authentication artifact,
the metadata including credential verification information that is usable to verify a credential of the principal,
the metadata further including a first principal identifier that identifies the principal;
receiving a request to authenticate the principal at the backup authentication system, the request including the credential of the principal and further including a second principal identifier that identifies the principal; and
authenticating the principal by the backup authentication system by verifying the credential of the principal, which is included in the request to authenticate the principal, using the credential verification information and further by determining that the first principal identifier, which is included in the metadata, corresponds to the second principal identifier, which is included in the request to authenticate the principal, based at least in part on the request requesting authentication of the principal.

11. The method of claim 10, further comprising:
receiving the authentication package from the primary authentication system by the backup authentication system while the primary authentication system is capable of providing valid responses to requests to authenticate principals;
wherein receiving the request to authenticate the principal comprises:
receiving the request to authenticate the principal at the backup authentication system as a result of the primary authentication system becoming incapable of providing a valid response to the request to authenticate the principal.

12. The method of claim 10, wherein storing the authentication package comprises:
storing the authentication package, including the authentication artifact as modified by the primary authentication system to remove or modify at least one claim from a plurality of claims that the authentication artifact initially includes, by the backup authentication system.

13. The method of claim 10, further comprising:
receiving a portion of a load of the primary authentication system at the backup authentication system based at least in part on the load of the primary authentication system being greater than or equal to a load threshold.

14. The method of claim 10, further comprising:
receiving a portion of a load of the primary authentication system at the backup authentication system while the primary authentication system is capable of providing valid responses to requests to authenticate principals; and
providing an indication of performance of the backup authentication system based on the backup authentication system handling the portion of the load of the primary authentication system.

15. The method of claim 10, further comprising:
determining by the backup authentication system that an authentication policy changes to disallow authentication of the principal after the principal is authenticated by the backup authentication system; and
revoking the authentication artifact by the backup authentication system so that the authentication artifact is unusable to authenticate the principal based at least in part on the authentication policy changing to disallow authentication of the principal.

16. The method of claim 10, wherein the metadata associated with the authentication artifact indicates a range of internet protocol (IP) addresses in which an IP address of the principal is to be included as a criterion for authentication of the principal using the authentication package;
wherein the method further comprises:
comparing the IP address of the principal to the range of IP addresses by the backup authentication system to determine that the IP address of the principal is included in the range of IP addresses; and
wherein authenticating the principal comprises:
authenticating the principal by the backup authentication system based at least in part on the IP address of the principal being included in the range of IP addresses.

17. The method of claim 10, wherein the authentication artifact is configured to be valid for a duration that is longer than a duration for which other authentication artifacts, which are used by the primary authentication system to authenticate principals, are configured to be valid.

18. The method of claim 10, wherein the request to authenticate the principal includes a source identifier, which indicates that the request is from a proxy system;
wherein the method further comprises:
analyzing the request to determine that the source identifier indicates that the request is from the proxy system; and
wherein authenticating the principal comprises:
authenticating the principal by the backup authentication system further based at least in part on the request being from the proxy system.

19. A computer program product comprising a computer-readable storage medium having instructions recorded thereon for enabling a processor-based backup authentication system to use an authentication package from a primary authentication system to authenticate a principal by performing operations, the operations comprising:
storing the authentication package at the backup authentication system,
the authentication package including an authentication artifact, which is signed with a cryptographic key by the primary authentication system and which includes one or more claims that are usable to authenticate the principal, and further including metadata associated with the authentication artifact,
the metadata including credential verification information that is usable to verify a credential of the principal,
the metadata further including a first principal identifier that identifies the principal; and
authenticating the principal by verifying the credential of the principal, which is included in a received request to authenticate the principal, using the credential verification information and further by determining that the first principal identifier, which is included in the metadata, corresponds to a second principal identifier, which identifies the principal and which is included in the request to authenticate the principal, based at least in part on the request requesting authentication of the principal.

20. The computer program product of claim 19, wherein the operations further comprise:
determining that an authentication policy changes to disallow authentication of the principal after the principal is authenticated by the backup authentication system; and
revoking the authentication artifact so that the authentication artifact is unusable to authenticate the principal based at least in part on the authentication policy changing to disallow authentication of the principal.

* * * * *